May 16, 1933.         C. G. OLSON              1,909,475
                      LOCK WASHER
                    Filed Sept. 2, 1930
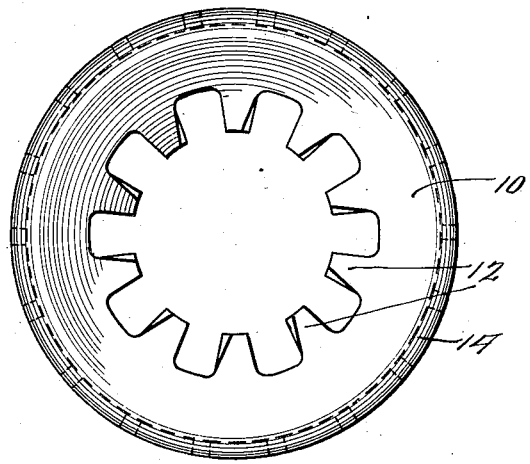
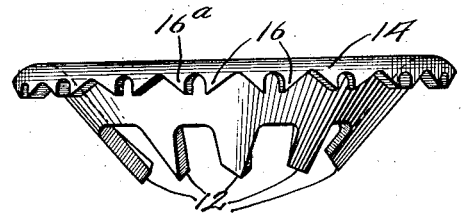
Inventor:
Carl G. Olson
By Cheever, Cox & Moore
          Attys.

Patented May 16, 1933

1,909,475

UNITED STATES PATENT OFFICE

CARL G. OLSON, OF CHICAGO, ILLINOIS, ASSIGNOR TO SHAKEPROOF LOCK WASHER COMPANY, OF CHICAGO, ILLINOIS, A CORPORATION OF DELAWARE

LOCK WASHER

Application filed September 2, 1930. Serial No. 479,173.

My invention relates generally to lock washers, and more particularly to lock washers which are adapted for use with wood screws and the like.

It is one of the primary objects of my invention to provide a washer which is particularly applicable for use with wood screws and to this end I propose to employ a washer which is provided with teeth adapted to engage the head of a screw and also teeth which are adapted to imbed themselves within the wood piece.

Another object of my invention is to provide a conical lock washer having one set of teeth for lockingly engaging a companion conical screw head and another set of teeth for lockingly engaging the work piece.

Still another object is to provide a lock washer, as above set forth, which is so arranged that when the same is clamped in position upon the work piece, the teeth which lockingly engage said work piece will be completely concealed.

A still further and more specific object of my invention is to provide a conical or countersunk type of lock washer having a plurality of internal teeth for lockingly engaging a screw head, and a plurality of outer marginal teeth adapted to lockingly engage the work piece so as to prevent rotation of the lock washer in either direction.

The above and numerous other objects and advantages will be more apparent from the following detailed description when considered in connection with the accompanying drawing wherein:

Fig. 1 is a plan view of a lock washer constructed in accordance with the teachings of my invention; and Figure 2 is a side elevational view of the washer of Figure 1.

My present application relates generally to the subject matter set forth in my copending application, Serial Number 479,174, filed of even date herewith wherein I have disclosed a flat type lock washer which is adaptable for use in connection with wood screws and the like.

Referring now to the drawing more in detail wherein like numerals have been employed to designate similar parts throughout the various figures, it will be seen that one embodiment of my invention contemplates a lock washer of the countersunk or conical type which includes a conical annular body portion 10 having a plurality of internal spaced prongs or teeth 12 formed along the margin thereof. These prongs are twisted out of the plane of the body portion so as to provide work engaging teeth or corners on opposite sides of the washer for lockingly engaging a screw head (not shown).

The outer margin of the body portion 10 is formed with an annular flange 14 which is rolled outwardly and downwardly. The lower edge of this flange 14 is provided with a plurality of teeth 16 and disposed immediately adjacent each of these teeth 16 is a complementary tooth 16a. It is to be noted that the teeth or spurs 16 are so arranged as to lockingly engage a work piece (not shown) so as to prevent clockwise movement of the washer as viewed in Figure 1, while the complementary teeth 16a are adapted, when imbedded within the work piece, to prevent rotation of the washer in a counter-clockwise direction. Thus, it might be stated that the flange 14 is provided with a plurality of alternate, oppositely acting locking spurs which are adapted to imbed themselves within the surface of the work, such as a wood surface, and thereby prevent the washer from being rotated in either direction with respect to said surface.

By having the outer margin of the washer body rolled in the manner shown and the teeth formed along the lower edge thereof, said teeth will become imbedded within the work surface without destroying or in any way impairing the external appearance of the surface. In other words, my lock washer is particularly adaptable for use on the outside of furniture, woodwork in automobiles, and the like, because when the washer is clamped in position against such surfaces, no unsightly external appearance is presented. In fact, the rolled flange of the washer presents a very neat appearance along the outer margin of the screw head and the teeth are so constructed that they will imbed themselves within the work without cracking or seriously injuring the surface thereof. Thus, the teeth or spurs 16 and 16a which extend in opposite directions with respect to the work piece, firmly anchor themselves within the surface of the work piece without subjecting the same to cracking.

From the foregoing it will be apparent that my invention contemplates the provision of an improved lock washer construction in which an annular body portion is provided with one set of teeth, namely the teeth or prongs 12, which are adapted to lockingly engage the head of a screw with respect to said work piece. My invention has a wide range of uses in view of the fact that it may be used in all instances where it is desired to secure a wood piece in position without seriously impairing or in any way disfiguring the surface contour of the work piece. That portion of the work piece which is lockingly engaged by the teeth 16 and 16a is completely concealed beneath the flange 14 and said teeth are so constructed as to be particularly applicable for use in connection with wood surfaces.

Having thus described my invention, what I claim as new and desire to secure by Letters Patent is:

1. A lock washer for use with conical head screws including a countersunk body portion of flat stock, a plurality of teeth formed along the inner margin of said body portion and warped out of the plane thereof for lockingly engaging a conical screw head, a rolled flange formed along the outer margin of said body portion, and a plurality of opposed teeth formed along the edge of said rolled flange which are adapted to engage the outer surface of the work piece for securing the washer against rotation with respect thereto.

2. A lock washer including an annular body portion of flat stock, a plurality of work engaging teeth positioned along a margin of said body portion for lockingly engaging a screw head, a plurality of teeth positioned along the other margin of said body portion and inclined so as to lockingly engage the work piece at a point spaced from the screw head, and a plurality of teeth positioned along said last mentioned margin which are oppositely inclined with respect to the other teeth on said margin for lockingly engaging said work piece.

3. A lock washer including a conical annular body portion, a plurality of twisted teeth extending from the smaller periphery thereof for engaging the head of a screw, a rolled flange formed along the outer margin of said body portion, and a plurality of alternately and oppositely leaning circumferentially disposed teeth extending in the axial direction and adapted to engage the surface of a work piece for securing the washer against rotation in either direction with respect thereto.

In witness whereof, I have hereunto subscribed my name.

CARL G. OLSON.